(12) United States Patent
Edwards et al.

(10) Patent No.: US 8,990,900 B2
(45) Date of Patent: Mar. 24, 2015

(54) AUTHORIZATION CONTROL

(75) Inventors: Nigel J Edwards, Bristol (GB); Michael J Wray, Bath (GB); Jose Maria Alcaraz Calero, Murcia (ES); Patrick Goldsack, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/805,160

(22) PCT Filed: Jun. 23, 2010

(86) PCT No.: PCT/US2010/039597
§ 371 (c)(1),
(2), (4) Date: Dec. 18, 2012

(87) PCT Pub. No.: WO2011/162750
PCT Pub. Date: Dec. 29, 2011

(65) Prior Publication Data
US 2013/0125217 A1    May 16, 2013

(51) Int. Cl.
*H04L 29/06* (2006.01)
*G06F 21/62* (2013.01)
*H04L 9/32* (2006.01)

(52) U.S. Cl.
CPC .............. *H04L 63/08* (2013.01); *H04L 63/102* (2013.01); *G06F 21/6218* (2013.01); *H04L 63/104* (2013.01); *H04L 9/3263* (2013.01); *H04L 2209/60* (2013.01)
USPC .......................................................... 726/4

(58) Field of Classification Search
CPC ... G06F 21/6218; H04L 62/08; H04L 63/102; H04W 12/06
USPC .............................................................. 726/4
See application file for complete search history.

(56) References Cited

U.S. PATENT DOCUMENTS 7,185,192 B1 * 2/2007 Kahn .............................. 713/155
7,444,666 B2 * 10/2008 Edwards et al. ................... 726/1

(Continued)

FOREIGN PATENT DOCUMENTS

CN   101242410   8/2008
CN   101257377   9/2008

OTHER PUBLICATIONS

The International Search Report and the Written Opinion of the International Searching Authority for International Application No. PCT/US2010/039597 dated Feb. 28, 2011, 12 pages.

(Continued)

*Primary Examiner* — Justin T Darrow
*Assistant Examiner* — Shahriar Zarrineh
(74) *Attorney, Agent, or Firm* — Hewlett-Packard Patent Department (57) ABSTRACT

The application describes an attestation system (705, 707, 710) in a cloud computing environment. The authorization system is configured to allow a plurality of users (701a-d) and applications (702, 706, 708, 709) of the cloud computing environment to issue attestations regarding attributes of other users and applications. The authorization system is also configured to control access to said attestations and to allow a plurality of users and applications of the cloud computing environment to query the authorization system to determine whether a specified user or application has a specified attribute. Methods of controlling access to resources in a cloud computing environment and also of providing secure attestations are also described.

14 Claims, 4 Drawing Sheets

(56) References Cited

U.S. PATENT DOCUMENTS

| | | | |
|---|---|---|---|
| 8,463,815 B1* | 6/2013 | Zoellner | 707/783 |
| 8,601,531 B1* | 12/2013 | Zolfonoon et al. | 726/1 |
| 2002/0083059 A1* | 6/2002 | Hoffman et al. | 707/9 |
| 2003/0105810 A1 | 6/2003 | McCory et al. | |
| 2005/0166041 A1 | 7/2005 | Brown | |
| 2005/0240765 A1 | 10/2005 | Genty et al. | |
| 2006/0075473 A1* | 4/2006 | Moreh et al. | 726/5 |
| 2007/0061872 A1* | 3/2007 | Carter | 726/4 |
| 2007/0294404 A1 | 12/2007 | Boutboul | |
| 2008/0313716 A1 | 12/2008 | Park | |
| 2009/0228967 A1 | 9/2009 | Gbadegesin et al. | |
| 2009/0235334 A1* | 9/2009 | Park | 726/4 |
| 2009/0249440 A1* | 10/2009 | Platt et al. | 726/1 |
| 2010/0325159 A1* | 12/2010 | Wright et al. | 707/783 |
| 2012/0017266 A1* | 1/2012 | DiChiara et al. | 726/4 |

OTHER PUBLICATIONS

David W. Chadwick, The PERMIS X.509 Role Based Privilege Management Infrastructure, Dec. 2002 (18 pages).

Fielding et al., Principled Design of the Modern Web Architecture, May 2002 (10 pages).

Morgan et al., Federated Security: The Shibboleth Approach—The open-source Shibboleth System extends Web-based applications and identity management for secure access to resources among multiple organizations, Educause Quarterly, No. 4 2004 (6 pages).

Robert Lemos, 5 Lessons from Dark Side of Cloud Computing, Computerworld, Aug. 2009 (2 pages).

Roy Thomas Fielding, Architectural Styles and the Design of Network-based Software Architectures, Dissertation, 2000 (180 pages).

Vika Felmetsger, CS 595G, Security Assertion Markup Language (SAML), Feb. 14, 2006 (24 pages).

\* cited by examiner

AUTHORIZATION CONTROL

CROSS-REFERENCE TO RELATED APPLICATION

This application is a U.S. National Stage Application of and claims priority to International Patent Application No. PCT/US2010/039597, filed on Jun. 23, 2010, and entitled "AUTHORIZATION CONTROL."

BACKGROUND

Cloud computing environments may provide computing infrastructures that are abstracted from the underlying physical hardware. Cloud computing environments may deliver Infrastructure-as-a-service (IaaS) by providing the ability to create virtual machines (VMs) on demand having defined attributes such as size, operating system, number of block devices etc. These VMs, which may be formed as encapsulated networks, may be carved out of the underlying physical hardware.

Figure 1:
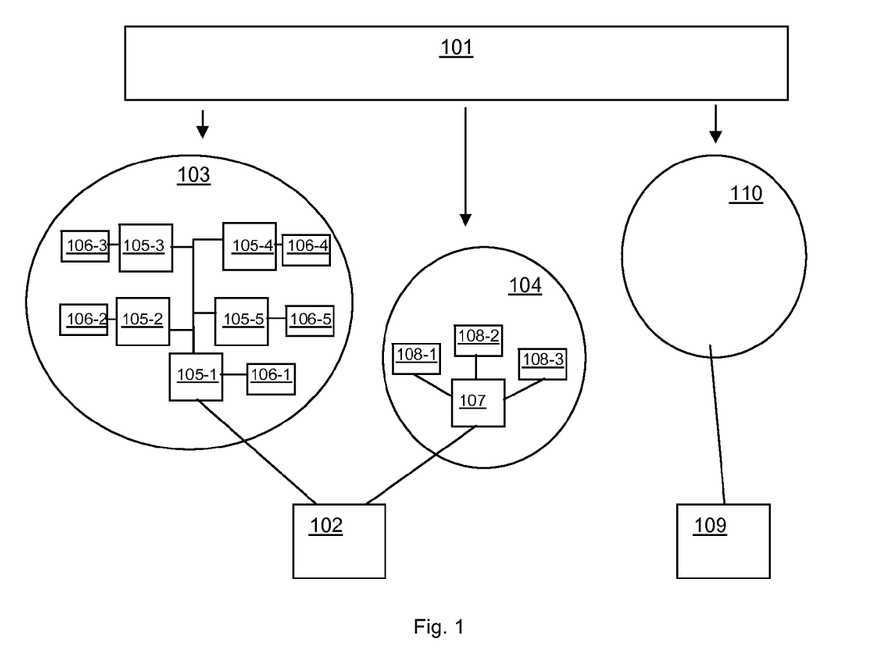
FIG. 1 illustrates an example of a cloud computing environment and a number of cells.

FIG. 1 illustrates an example of a cloud computing environment. In the example shown in FIG. 1, a physical computing hardware infrastructure 101 is shown. The physical computing hardware infrastructure could, for example, comprise one or more data centres or the like comprising a plurality of servers, one or more supercomputers or any collection or network of computing resources. The physical hardware may be owned and controlled by one organisation and made available to other organisations, for instance as part of an Infrastructure-as-a-service and/or Platform-as-a-service business, or the hardware could be the hardware of a single organisation operated as a cloud computing environment for its own users.

The physical hardware can be used to provide appropriate VMs on demand to users. The VMs may be associated with volumes, i.e. virtual disks, for operation and data storage. In one implementation, the VMs and volumes are provided within cells, with each cell being an encapsulated network comprising one or more VMs and/or volumes. A cell, in an implementation of a cloud computing environment, is a virtualized infrastructure, derived from the underlying physical infrastructure, which may be separated from other virtual resources provided by the same physical infrastructure by encapsulation. In other words a cell is a collection of virtual resources which may be isolated within a virtual security boundary and wherein network security rules may control any data traffic into or out of the cell. A cell therefore may provide a virtual network that may be connected to a wider network and in which network security rules may mean that one cell is isolated from another cell, other than through connection rules that can be controlled by the owner of the cell. By default each cell may be completely isolated from all other cells although the owner of a cell can control interaction of the cell with external entities through network access rules.

Within a cell one more virtual machines may be instantiated and may form a virtual network. Volumes are components of a cell. In the context of cloud computing a volume is a virtual component accessible by a VM that provides persistent storage for persisting the state of a VM or an image or components used to form a VM. In the context of cloud computing a volume is abstracted from any underlying physical storage hardware and thus is separate from and not tied to any particular storage resource or type of resource but provides a single, distinct virtual storage resource with defined attributes such as size.

FIG. 1 shows a first user, 102, running two cells, 103 and 104. The user 102 accesses the cells via a user interface provided by the user's local workstation for example.

The user 102 specifies the number and attributes of VMs and associated volumes for the cell. Cell 103 shows an illustrative network of several VMs 105-1 to 105-5 each having an associated volume 106-1 to 106-5. Cell 104 shows an illustrative network comprising a single VM 107 having three associated volumes 108-1 to 108-3. FIG. 1 also illustrates another user 109 running a different cell 110.

In some embodiments users may share services within the cloud computing environment and applications running within the cloud computing environment may interact with other applications autonomously. Thus the cloud computing environment may be characterized by a collection of loosely coupled, autonomous services.

BRIEF DESCRIPTION OF THE DRAWINGS

Implementations will now be described by way of example only with reference to the following drawings, of which.

DETAILED DESCRIPTION

Security is an important consideration in many computing environments and especially in a cloud computing environment. An important aspect of security is authorization to control access to services and resources.

Figure 2:
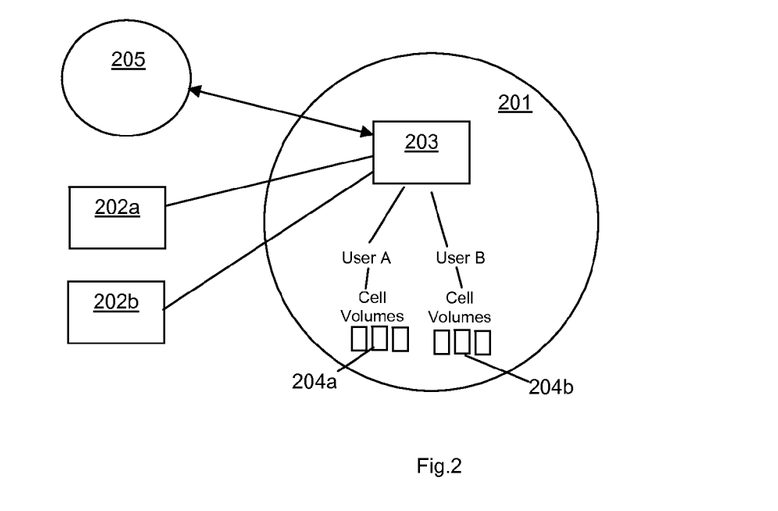
FIG. 2 illustrates an implementation of a volume management system.

For example FIG. 2 illustrates a volume management service 201 that may be shared with a plurality of users 202a and 202b. The volume management service 201 may allow users to create and modify cell volumes, i.e. the virtual disks that may be attached to virtual machines (VMs) in use. The volume management service may be instantiated within its own cell in a cell based cloud computing environment and may provide a volume management server VM 203 for performing various management functions. User 202a may connect to the volume management server 203 and have access to that user's cell volumes 204a. User 202b may also connect to the volume management server 203 to access the cell volumes 204b owned by user 202b.

In general user 202a may want to be the only user who can access the volumes 204a that user 202a owns. However in some situations user 202a may be want to allow one or more other users (e.g., user 202b) to access one or more of the volumes that user 202a owns. In addition, user 202a may want to allow one or more applications of the cloud computing environment (e.g., application 205), for instance a virus scanning application, to be able to access the volume 204a for the purposes of performing a scan of the volume.

Figure 3:
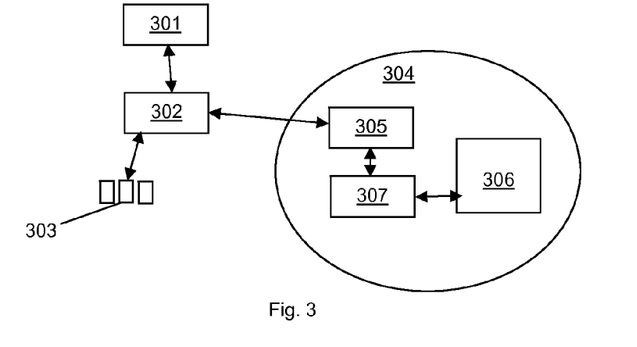
FIG. 3 illustrates an implementation of an authorization system in a cloud computing environment.

FIG. 3 illustrates an implementation of an attestation system, for example an authorization system, in a cloud computing environment for controlling access to services and resources. FIG. 3 shows an entity 301 accessing an application 302 which, in this example, may be a user accessing a volume management server VM such as described above. It will be clear however that entity 301 could also be an application of the cloud computing environment. The user 301 may access the volume management server and request an action in relation to volumes 303. The volume management server needs to determine whether the user 301 is authorized to perform the requested action on the specified volumes. For instance, if the user attempts to access a list of available volumes or perform a search for volumes meeting certain criteria, the volume management server needs to determine which volumes user 301 is authorized to discover, e.g. has read access. If the user 301 selects a particular volume and attempts to modify that volume the volume management server needs to determine whether user 301 has the authorization to modify that volume, e.g. has been granted write access to that particular volume.

The volume management server therefore contacts authorization system 304 to determine whether user 301 has the necessary authorization to perform the requested action on the specified resource. In one implementation the volume management server generates a query that asks the authorization system whether user 301 is authorized to perform the requested action on the specified resource.

In one implementation the authorization system 304 may comprise an authorisation server VM 305 that interacts with the volume management server. The authorization system 304 controls access to a store 306 of attestations which govern authorizations. Attestations are statements, that have been previously issued by an entity, that indicate that another entity, the subject of the attestation, has a certain property. An attestation is thus a prior issued confirmation that the subject has the relevant property. The property may be permission to perform some action and/or it may be any attribute of the subject relevant to access. Attestations are secure statements that can be relied upon to make authorization decisions. In one implementation the authorization system provides the security for issued attestations.

The authorization system receives the query at the authorization server 305 and passes the query to a decision engine 307. The decision engine determines, from the store of attestations 306 that have been issued, whether user 301 does have authorization to perform the requested action on the specified resource. The decision engine 307 therefore makes the decision as to whether or not user 301 is authorized and acts as a Policy Decision Point (PDP). The authorization system may then respond to the volume management server 302 (via authorisation server 305) with the result of the decision as to whether user 301 is, or is not, authorized for that action. The volume management server 302 then uses the result of this decision to accordingly grant or deny access to user 301. The application, i.e. the volume management server in this example, therefore acts as a Policy Enforcement Point (PEP).

It will be appreciated that the authorization system, in a cloud computing environment may comprise one or more virtual machines (VMs). For instance the authorization server may be a VM instantiated within the underlying physical infrastructure, i.e. the underlying computer hardware provides the authorization server. The store 306 of attestations may be provided by one or more volumes attached to the VM and implemented within the underlying physical infrastructure.

The volume management server may verify the identity of user 301, i.e. the volume management server may authenticate user 301. In one implementation the volume management system authenticates the identity of user 301 before generating the query to the authorization system. The volume management server may use any type of authentication, for example using an X509 encryption scheme, Kerberos or OpenID or any other suitable authentication protocol. In this implementation authentication is thus decoupled from authorization. The identity of the user communicated by the query may simply be a string, for instance a typed string, which is derived from the authentication procedure performed by the volume management server.

The volume management server, i.e. the application, may query the authorization system with a relatively simple query and the authorization system may respond with a decision, e.g. authorization True or False. This avoids the need for the attestations to be digital certificates. Managing and processing of digital certificates can be complex. Implementations of the authorization system which avoid the need for the attestations to be digital certificates may avoid such complexity. In such a case the users and applications of the cloud computing environment trust the authorization system as well as the parties issuing attestations—however the authorization system itself can be made secure and the improved ease in implementing a secure authorization system will mean that application developers are much more likely to develop secure applications.

The authorization system may be implemented as a local object as a component of an application or service. In other words an instance of an authorization system may comprise part of an application of the cloud computing environment so that said application has the authorization system embedded within it as a local object. For example the authorization system may be a component of a volume management system, run as a local object which is part of the volume management system, e.g. a Java object. Being able to run the authorization service as a local object means that authorization can be included at a very early stage of development of a service and no extra infrastructure may be needed to be developed or deployed.

The authorization service may also be implemented as a stand alone service within the cloud computing environment and may be accessed, for example, via a secure communication protocol such as HTTP/SSL. In either case the programming abstraction is the same.

As will be described in more detail later there may be a plurality of instances of the authorization system instantiated within a single cloud computing environment and the authorization system may be multi-tenant, i.e. useable by a plurality of users. As will also be described in more detail later the authorization system is useable by applications of the cloud computing environment and applications may autonomously issue attestations.

The authorization system uses attestations to determine whether or not a user or application of the cloud computing environment is authorized to perform an action on a resource.

In one implementation the primary abstraction chosen for authorizations is the notion of a path. Programmers and developers are familiar with the concept of a path and use of a path allows ease of authorization to a plurality of resources.

The attestations may comprise access right attestations. An access right attestation specifies that a subject, i.e. one or more users and/or applications, is authorized to perform a specific action on a specific resource. The subject may comprise a string identifying one or more users or applications. The string may be a typed string, for example the type may specify 'user'—in which case the string identifies a user—or may specify 'group'—in which case the string denotes a group that will be recognised by the authorization system. The specific actions that are being allowed may be specified by denoting a privilege, for instance read, write, copy etc. A particular privilege may enable multiple actions, for instance a write privilege may enable action of modifying or updating as well as deleting a resource such as a volume. A write privilege may also be taken to include all the actions available at a read privilege level so as to avoid the need to specify each individual privilege separately. The cloud computing environment may be configured with a common set of privileges for access to resources such that access to different applications and resources can be controlled using the common set of privileges. However in some implementations a particular application may want to introduce bespoke privileges for that application. Queries from such an application, and attestations regarding access to such an application, may therefore refer to such bespoke privileges and the authorization system would confirm whether or not a particular subject had been granted a bespoke privilege. Such bespoke privileges would be recognised by the particular application but may not be recognised by other applications.

The designation of the resource may comprise a designation of the path to the resource. As mentioned above a path may be a familiar concept to programmers and developers and provides a convenient method to designate a resource in a cloud computing environment. The designation may also include a designation of the type of resource. Using a path based designation of resources, the attestation may designate a resource at a specified node of a path, for instance in a hierarchical directory storage system the path could designate a particular volume. For example a path in the form of: /users/user_a/volumes/vol1 would designate a volume named 'vol1' in the specified directory The designation of the resource could also indicate all resources below the designated node in the path, for instance a designation: /users/user_a/volumes/* may be used to identify all resources, of the specified type if a type of resource is included, within the relevant directory or any sub-directory.

The designation of subject and privilege may also include a designation, for instance a wildcard character, such as '*', or a term 'all', to indicate that all subjects or all privilege levels are granted.

As the authentication system may be multi-tenant and may be used by a plurality of users and applications the attestations may also include an indication of the identity of the entity issuing the attestation. In this way a user or application may only use attestations which are issued by entities that they have chosen to trust. The designation of the issuer may be a string which indicates the user or application making the attestation. The process of issuing attestations will be described below but an entity issuing an attestation may authenticate itself to the authorization system. In this way the consumer of the attestation may trust the authorization system to have correctly authenticated the issuer of the attestation and thus, if they trust that issuer, can trust the attestation.

In one implementation an access right attestation is therefore a 5-tuple, i.e. an ordered list of five elements, comprising: (issuer, subject, path, interface, privilege) wherein the interface element denotes the type of resource. For example an access right attestation may be:

issuer: user(Alice), subject: user (Bob), path:/users/Bob/*, interface: directory, privilege: write This attestation therefore indicates that the user whose common name is Alice has granted write access to the user whose common name is Bob for everything within and below a /users/Bob directory. Thus a request by user Bob to modify a volume at /users/Bob/volumes/vol1 may be authorised by the authorisation system.

As mentioned above the authorization system may allow attestations based on groups of users or applications. The definition of groups can reduce the number of attestations required and allows the ability for role based access by grouping users by role and authorising access to relevant role based groups. In order that the membership of groups is correctly controlled the attestations controlled by the authorization system may include group attestations.

A group attestation specifies that a subject, i.e. one or more users and/or applications, is a member of a specified group. The group attestation may also comprise a designation of the issuer of the group attestation. A group attestation in one implementation therefore comprises a 3-tuple: (issuer, subject, group-name). The issuer and subject may be strings that define the name of the issuer and the subject respectively and may be typed strings. The subject may itself be a group to allow for hierarchies of groups, i.e. one group, and thus all its members, may be a member of another group. The group-name may be any string used to designate a group.

For example the following group attestations:
issuer: user(Alice), subject: user(Bob), group-name: engineer
issuer: user(Charlie), subject: user(Dave), group-name: manager
issuer: user(Alice), subject: group(user(Alice), engineer), group-name: employee
issuer: user(Alice), subject: group(user(Charlie), manager), group-name: employee indicate that user Alice has attested that user Bob is in a group called 'engineer' and that user Charlie has attested that user Dave is in a group called 'manager'. User Alice has also attested that both the group 'engineer' (issued by Alice) and the group 'manager' (issued by Charlie) are part of the group called 'employee'. Groups may be scoped by the issuer, i.e. the designation of the Group includes a reference to the issuer of the attestation that defines the Group. This means that the group (user(Alice), engineer) is different to a group also called engineer which is issued by a different user, e.g. (user (Eve), engineer). This scoping of groups by user avoids any conflict if different users choose different group names.

An access right attestation which authorized a member of the 'employee' group (as issued by Alice) to perform a particular action, i.e. an attestation where the subject is group (user(Alice), employee), would therefore, in this example, grant authorization to both Bob and Dave.

In one implementation the attestation may also comprise attribute attestations that specify attributes of one or more users or applications or of resources that may be accessed. For example a user wishing to use a particular application, for example an email service of the cloud computing environment provided through the user's employer, may be allowed access only if the user has completed a training course or refresher course, for instance a standards of business conduct course, required by the user's employer. The training course could be provided by a training application implemented in the cloud computing environment. If a user successfully completes the training course, the training application may issue an attestation that the relevant user has completed the course. Without such a valid attestation the email service may deny that user access to the services. As another example a volume management system may allow a user to access or use volumes only if the volumes have been scanned and deemed virus free by a virus scanning service.

In this implementation applications and services of the cloud computing environment can thus issue attestations autonomously and many different applications may be able to issue attestations. This avoids the need for a single, central attestation authority managed by human administrators. Within a collection of loosely coupled services, such as is characteristic in cloud computing environments, central control of attestations would be complex and time consuming. However by allowing autonomous issuing of attestations and allowing users to specify the issuers of attestations that they will trust, the management of authorization is greatly simplified.

An attribute attestation may comprise an indication of the subject of the attestation which may comprise one or more users or applications of the cloud computing and/or one or more groups and which may, in some implementations, comprise an indication of the resource.

An attribute attestation may also comprise an indication of the relevant attribute which, in one implementation, may comprise a type and a value. The type may define the appropriate type of value, i.e. Boolean value, date, string etc. with the value then representing an appropriate indicator of the value. For example, if the attestation is that a particular user has completed a refresher course the subject may comprise the identity of the relevant user, the type may indicate a date and the value may comprise the relevant date that the course was successfully completed. This can allow an authorization query to be constructed that asks whether a particular user has undertaken a refresher course within a specified time period, e.g. within the last two years.

The attribute attestation may comprise an indication of the issuer of the attestation. A consumer of the attestation may only trust attestation issued by certain entities and so an indication of the issuer may be important.

In one implementation, at least some attestations may comprise a path indictor for storing the attestation. In other words the attestations may be stored in a directory based structure wherein the path indicates the relevant directory of the storage structure. In some instances the path for storing the attestation may correspond to a path to the relevant resource to which the attestation applies or in some instances the path may be related to an application making the attestation. Providing a path based storage structure for at least some attestations may enable attestations to be managed on a path based basis. For instance a user may be granted read access to all attestations below a certain node in the structure as will be described later. This can ease management of access control to attestations, especially for attribute attestations.

For example a virus scanning application may run a scan on all of a particular user's volumes, say Alice's volumes. The results of the scan may be stored as an attribute attestation in a directory within the storage of the authorization system such as //virus_scanner/scans/Alice. The contents of this directory may be accessed as read-only by anyone who has been granted read access to Alice's volumes. As another example a training application could store the date of completion of a refresher course by an employee in a directory //training_app/refresher/status/ which is read access by all members of the group 'Human Resources'.

The use of a path for storing attestations provides a fully structured name-space for authenticated attributes. Applications can autonomously issue attestations by using the authorization system and these are stored with a specified path. Consumers of the attestations know that write access to the attestations is controlled and limited, by the authorization system. In one implementation only the original issuer of an attestation is permitted to update or modify an attestation. However, the authorization system may allow read access, based on that path, to specified users, groups of users or applications. This avoids the need for the attestations to be digital certificates thus avoiding the ensuing complexity.

In the absence of a specified path for storing the attestation the authorization system may store the attestation in one or more storage systems, such as a database, accessible by the authorization system. The authorization system may store the attestation based on the type of attestation, i.e. access right or group or attribute. In general the storage system may be individual to the instance of the authorization system and may comprise part of the authorization system. However, in one implementation the storage may be external to any particular instance of the authorization system but accessible by that instance of the authorization system.

Figure 4:
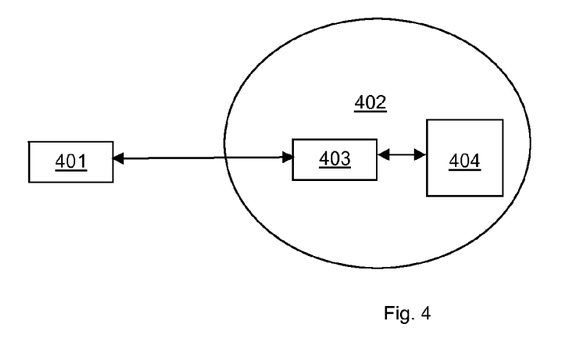
FIG. 4 illustrates an implementation of an entity using an authorization system to issue an attestation.
Figure 5:
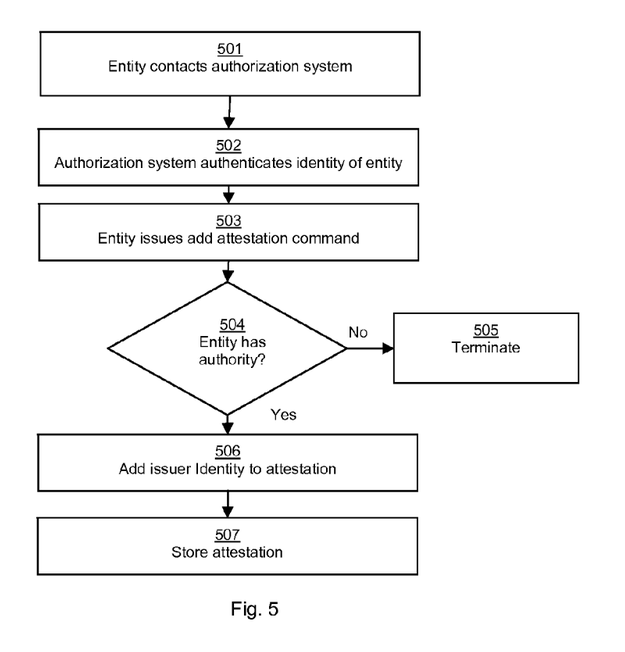
FIG. 5 shows a flowchart of one method of issuing an attestation.

FIG. 4 illustrates an implementation of an entity using the authorization system to issue an attestation and FIG. 5 illustrates a flowchart of the steps in issuing an attestation. FIG. 4 illustrates that an entity 401 may access an authorization system 402 (step 501) via a suitable communication protocol such as HTTP/SSL. The authorization system may comprise an authorization server 403 to interact with the entity 401 and a store 404. The authorization server 403 may be a VM provided by the underlying physical infrastructure. To establish a session with the authorization system 402 the entity authenticates itself to the authorization system (step 502). Any suitable authentication protocol, such as X509 authentication, may be used by the authorization system to authenticate the entity and in some implementations the authorization system may be configured to undertake one of a plurality of possible authentication protocols depending on the nature of the entity. The entity 401 may be a user of the cloud computing environment, for instance a user accessing the authorization system via a computer workstation or mobile computing device or any other suitable computing hardware. Alternatively the entity may be an application of the cloud computing environment, for instance comprising one or more VMs instantiated in the underlying physical infrastructure, i.e. the underlying computing hardware, configured to run an application. Thus applications or services of the cloud computing environment can autonomously issue attestations. The ability for applications to autonomously issue attestations improves the flexibility of the authorization system in a cloud computing environment and reduces the need for a central user based control.

Once a session has been established the entity 401 can send the authorization system a command to add an attestation (step 503). The command may specify the type of attestation being made, and specify the elements of the attestation. For instance the command to add an attestation may comprise a command to add an access right and may specify the subject of the right, the path of the resource, the interface, i.e. type of resource and the privilege granted as described above. Thus a command such as     addGrant (subject: user(Bob), path: /users/Alice/*, interface: dir, privilege: read)

would give the user Bob read access over the whole content of directory /user/Alice. The authentication system receives the command and determines (step 504) whether the entity 401 has authority to add such an access right. The ability to grant access rights may be limited to certain defined users and/or applications and/or the type of attestation that can be made may be limited. Thus if the entity is user Alice and the directory users/Alice is where volumes created by Alice are stored, then Alice may be authorized to add such a grant. However Alice may not be authorized to add a grant to the directory users/Bob. The process of checking whether the entity 401 has the necessary authorization to add the attestation may use basically the same process that is used in response to an access right query, which will be described in more detail later.

If the entity does not have the necessary authorization the process may be terminated (step 505). However if the entity is authorized the identity of the entity 401, as authenticated in step 502, is added to the attestation (step 506) and then the complete attestation is stored (step 507) in a store 404, which may be a volume provided by the computer memory/storage of the underlying physical resources.

The attestation may be stored in a store 404 which is encapsulated within the authorization system 402 and accessible only via the particular authorization server 403. Thus the authorization server 403 may control all access to the store of attestations. However in one implementation the store 404 may be external to the authorization system 402 and/or may be accessible by a different instance of an authorization system.

In some implementations at least some attestations are stored with a designated path within store 404. For instance entity 401 may be a training application which has been used by a user to complete a refresher course. In this case the attestation may be an attribute attestation specifying the date of completion. The command to add an attestation may thus comprise a path to store the attribute, for example:

addAttribute (subject: user(Bob), path: //courses/status, type: date, value: 23 Jan This would instruct the authorization system to add an attribute attestation at the specified path within store 404 that Bob completed the refresher course on 23 January.

As mentioned above the identity of the issuer may be stored in the attestation by the authorization system. In this implementation it may not possible to issue attestations on behalf of a third party. Thus a consumer of attestations, who may only trust attestations issued from certain trusted sources, knows that the authorization system has authenticated the identity of the issuer and thus an attestation designating a particular issuer is authentic, thereby avoiding the need for the attestations to comprise digital certificates.

Referring to FIG. 4 a user establishing a session with the authorization server 403 may also use the connection to manage their attestations. The authorization system may provide a variety of facilities for managing authorizations such as searches, edit functionality etc. The user may list or search the attestations and may modify or update attestations as necessary. The attestations themselves may contain sensitive information. For instance the membership of various groups could be sensitive or the access rights given to a particular user may also be sensitive. Access to the attestations themselves may thus be controlled by the authorization system. There may therefore be access rights governing which users can read existing attestations. This provides the ability to allow selective access to the attestations which is not possible when using digital certificates and protects the privacy of the subject and the issuer of the attestation. Further the attestations which control access to the attestations can be changed dynamically. As mentioned above access control may be based on the path by which attestations are stored and access may be given for a specified node and all nodes below it.

By default an issuer of an attestation, such as an access right attestation or a group attestation, may be the only user who is authorized to read, modify or delete an attestation, although some attestations may be time limited and may expire. The issuer of an attestation may be able to authorize other users to read and/or write, i.e. modify an existing attestation. For example in an organisation the management of groups may be the responsibility of human resources. An administrator may therefore create a group attestation to create an initial human resource group. The human resources group may then be authorized to create new group attestations and modify or replace existing group attestations (including the human resources group).

Figure 6:
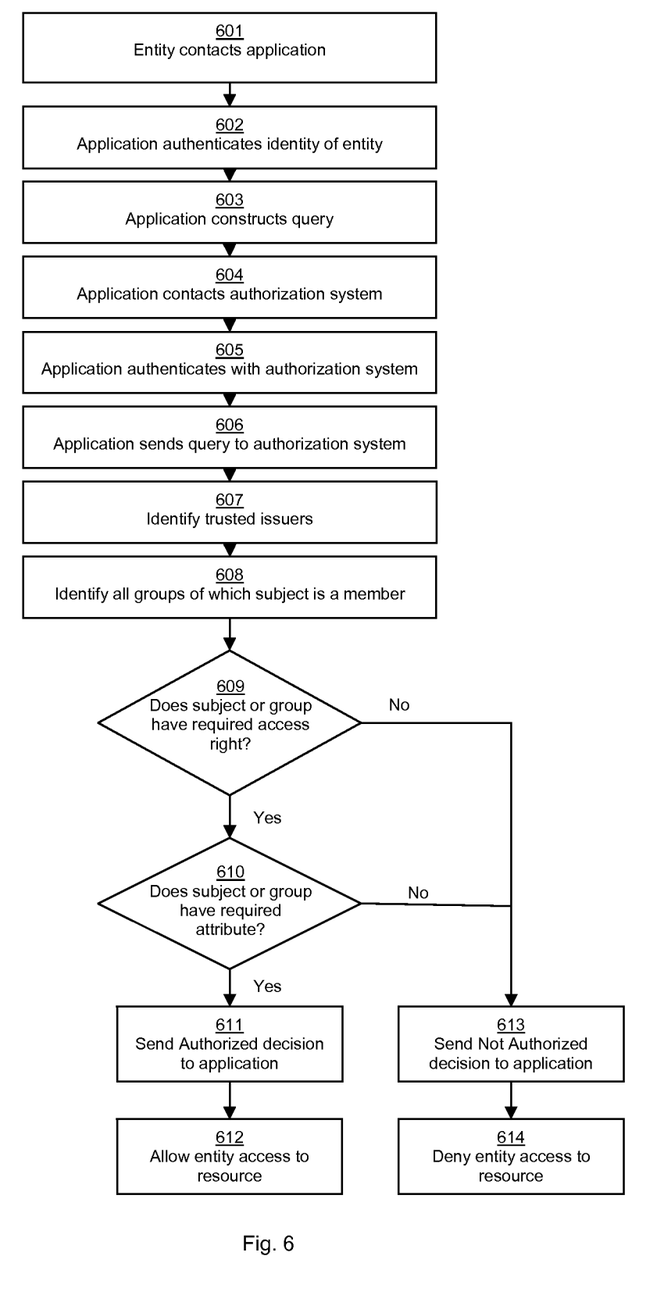
FIG. 6 shows a flowchart of one method of querying whether an entity has authorization.

Once the attestations have been issued the authorization system can be used by other entities to determine whether or not a user or application of the cloud computing environment is authorized to perform a specific action as described above in relation to FIG. 3. FIG. 6 illustrates a flow chart of one method of access control.

As shown in FIG. 3 an entity 301 contacts application 302 in order to access some resources 303 (step 601). The application 302 authenticates the identity of the entity 301 using any suitable authentication protocol (step 602) such as X509, Kerberos, OpenID and the like. As the authentication is performed between the application 302 and the entity 301 and is decoupled from authorization, different applications can use different authentication protocols within the cloud computing environment with the same authorization system.

Once the application 302 has authenticated the entity 301, the entity may request access to some resource, for instance a user may request to access a directory of a storage service or attempt to perform a search and a virus scanning application may request access to volumes for virus scanning. The application determines the action and resource requested by the entity 301 and constructs a query (step 603). The query may be a query as to whether a subject, i.e. the requesting entity, has authority to perform a specified action for a specified resource. The form of the query may match the general form of the access right attestation. The subject may be denoted by the common name of the entity 301 as determined in the authentication step. The specified resource may be specified by a path to the relevant resource. The type of resource may also be specified in an interface field. The requested action may be specified by denoting the required privilege level. For example, if entity 301 is a user, Alice, and the application is a storage server, and Alice is wanting to access a directory at /user/Alice/vol1 the query may take the form hasAuth (subject: user(Alice), path: /users/Alice/, Interface: dir, privilege: read)

In some implementation, where access to a service is also dependent on a particular attribute, such as, for example, a user having completed a refresher course within the last two years, the query may also query whether the subject has a relevant attribute attestation. For example hasAttr (subject: user(Alice), path: /course/status, type: date, value: >Jan. 1, 2009)

may comprise part of the query that ask whether user Alice has a course completion date stored at the location which is more recent than 1 Jan. 2009.

In some implementations the query may include an indication of all issuers of attestations that the application and/or entity will trust, i.e. to determine which attestations should be used in deciding for an authorization decision. In other implementations the trust relationships for applications and/or users may be stored by the authorization system and retrieved by the authorization system based on the identity of the application and/or subject of the query.

The application 302 makes contact with the authorization system 304 (step 604). Although shown in this example as making contact with the authorization system after generating the query it will be clear that the query could be generated during or after the step of making contact with the authorization system. If the authorization system is a stand-alone service or part or a different application to application 302 then the communication is via any suitable secure protocol, such as HTTP/SSL and the application and authorization system may mutually authenticate (step 605). However in instances where the authorization system is running as a local component within the application there may be no need to authenticate and communication may be inherently private.

Once a suitable connection is established the application 302 sends the query to the authorization system 304 (step 606).

The authorization system receives the request and determines the list of trusted issuers that the application and/or entity is prepared to trust (step 607). As mentioned above this may be contained within the query or the authorization system may access a list of stored relationships based on the identity of the application and/or the subject.

The authorization system may then search the stored attestations of trusted issuers to determine whether the subject is the member of any groups and to identify such groups (step 608). This may involve an iterative search as, if the subject, say an individual user Alice, is part of a group, say 'engineers' it will be necessary to then determine if the group 'engineer' is itself part of a larger group.

Once all groups have been identified the access right attestation may be searched (step 609) to determine if the subject, or any of the groups to which the subject belongs, has the necessary access right (as attested by a trusted issuer).

If the query involves authorization being conditional on a particular attribute attestation a search may also be performed (step 610) to determine whether the subject or a relevant group has the necessary attribute (as attested by a trusted issuer).

If the subject is found to have the necessary access right and any necessary attribute (as attested by a trusted issuer) the decision is taken to authorize the requested action and this decision is communicated to the application 302 (step 611). The application receives the decision to authorize and enforces the decision by allowing the entity 301 access to the requested resource (step 612). However if the necessary access right is not found or if a necessary attribute is not found (as attested by a trusted issuer) then the decision is made by the authorization system that the requested access is not authorized. This decision is sent to the application (step 613) and the application enforces the decision by denying access (step 614).

Figure 7:
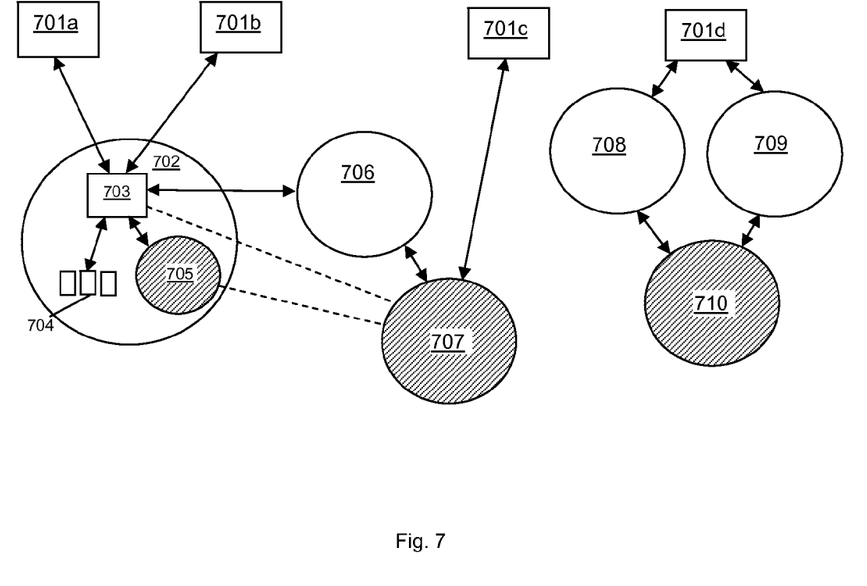
FIG. 7 illustrates an implementation of a plurality of instances of an authorization system

As mentioned above there may be several instances of the authorization system in a cloud computing environment. FIG. 7 illustrates an implementation with several instances of an authorization system.

FIG. 7 shows a plurality of users 701a-d. Users 701a and 701b are separately accessing a volume management service 702 similar to that described above in relation to FIG. 2. Each of user 701a and user 701b establishes a session with the volume management server VM 703 in order to access and manage volumes 704. In order to decide whether or not user 701a is authorized to access the volumes 704 the volume management server communicates with an authorization system 705 as described above. In this implementation authorization system 705 is provided as a component of the volume management system 702, for example as a local Java object. The network rules within volume management system 702 are such that only the volume management server can generally directly access the authorization system 705. Users 701a and 701b may, in some implementations, be users from different organisations and the volume management system uses the authorization system 705 to determine which user can access which volumes 704.

The volume management server may also be accessed by an application 706 of the cloud computing environment which may, in this example, be a virus scanning application. The virus scanning application may be arranged to scan volumes managed by the volume management system 702, for instance user 701b might arrange for the virus scanning application to periodically scan the volumes controlled by user 701b. The virus scanning system 706 may therefore periodically contact the volume management server 703 for read access to the volumes of user 701b. The volume management server 703 may query the local authorization system to determine whether the virus scanning system 706 is authorized to access the requested volumes.

The results of the virus scan may be stored as an attribute. The results may comprise an attestation by the virus scanning system that specified volumes are virus free. The virus scanning system may be configured to issue such attestations using the authorization system 705, via the volume management server 703. This means that the attestations regarding the virus attributes of the volumes are stored in authorization system 705 along with the access controls for said volumes. Alternatively the virus scanning system may be configured to contact a stand alone instance of an authorization system 707. Authorization system 707 may be largely identical to authorization system 705 with the exception that authorization system 707, being generally accessible, will undergo an authentication step with any entity contacting it. The virus scanning system may use authorization system 707 to store the relevant attestations.

As the volume management server 703 may require access to the attribute attestations stored by authorization system 707 it may also be arranged to interrogate authorization system 707. Alternatively the volume management server 703 may communicate only with its own embedded authorization system 705 and this embedded authorization system 705 may be configured to contact stand alone authorization system 707 to determine whether an appropriate attestation from the virus scanning system 706 exists. For instance in an implementation where each authorization system comprises an authorization server the relevant authorization servers may communicate with one another.

User 701c may contact authorization system 707 directly in order to add new attestations or amend existing attestations. However access to its store of attestations is controlled by the authorization system 707 and only attestations that user 701c is authorized to read will be displayed. Further the ability of user 701c to add new attestations or amend existing attestations may be limited, for instance to certain specified resources.

FIG. 7 also illustrates two further applications 708 and 709, for instance a training application and email service respectively.

The training application 708 may check with authorization system 710 that user 701d is authorized to access training material for a particular subject, for instance to complete a specified on-line training module, such as a standards of business conduct refresher course. Also, when user 701d does take and successfully complete such a module the training application may use the authorization system to issue an attestation with the date that the course was completed. This attestation is generally stored within the authorization system 710 but, in one implementation, could be stored in a general store (not shown) or within a secure storage area of the training application.

The email service 709 may check that a user 701d is authorized to access a mailbox by querying authorization system 710. Further, the email service may allow user 709 to send an email only if an attestation from the training application exists that confirms that the relevant user has completed a 'standards of business conduct' refresher course within a set period of time.

The implementations of the authorization system described above provide a simple model to application developers as well as to the administrators of the authorization system. The authorization system utilizes programming abstractions and interaction models and may enable relatively painless adoption by developers who may not be security experts, thereby increasing the likelihood of correct, secure implementation.

The described systems, methods, and techniques may be implemented in digital electronic circuitry, computer hardware, firmware or software stored in and executing on one or more computer hardware components, or in combinations of these elements. Apparatuses embodying these techniques may include appropriate input and output devices, a computer processor, and instructions tangibly embodied (e.g., stored) in a machine-readable storage device for execution by a programmable processor. A process embodying these techniques may be performed by a programmable processor executing a program of instructions to perform desired functions by operating on input data and generating appropriate output. The techniques may be implemented in one or more computer programs including instructions that are executable on a programmable system including at least one programmable processor coupled to receive data and instructions from, and to transmit data and instructions to, a data storage system, at least one input device, and at least one output device. Suitable processors include, by way of example, both general and special purpose microprocessors. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It should be noted that the above-mentioned implementations are illustrative rather than limiting, and that implementation modifications are possible. For example, advantageous results may be achieved if acts of the disclosed techniques are performed in a different order and/or if components in the disclosed systems are combined in a different manner and/or replaced or supplemented by other components. Moreover, the word "comprising" does not exclude the presence of elements or steps other than those listed in a claim, and use of the terms "a" or "an" does not necessarily exclude a plurality. Any reference signs in the claims shall not be construed so as to limit their scope.

The invention claimed is:

1. An attestation system in a cloud computing environment, comprising:
   an authorization system comprising a physical processor, the authorization system to:
   receive first attestations and second attestations issued by users and by applications of the cloud computing environment, each of the first attestations specifying attributes of a user or application, and each of the second attestations specifying that a respective subject is authorized to perform an action on a respective resource, and each of the second attestations containing an identifier of a respective issuer of the corresponding second attestation;
   control access to the first and second attestations;
   receive at least one query from a requesting user or application of the cloud computing environment, the at least one query including information identifying issuers trusted by the requesting user or application; and
   in response to the at least one query:
   select a second attestation, from the second attestations, that has an identifier of one of the issuers identified by the information, and
   determine, based on at least one of the first attestations, whether the requesting user or application has a specified attribute, and determine, based on at least the selected second attestation, whether the requesting user or application has a right to access a specified resource.

2. An attestation system as claimed in claim 1, wherein the authorization system is configured to:
   receive a command to add a given one of the first and second attestations, wherein the command specifies a designated path to store the given one of the first and second attestations; and
   in response to the command, store the given one of the first and second attestations at the designated path in a data store.

3. An attestation system as claimed in claim 1, wherein a given one of the second attestations specifies that a group of users has a right to access a respective resource.

4. An attestation system as claimed in claim 3, wherein the given second attestation is a group attestation specifying members of the group.

5. An attestation system as claimed in claim 1, wherein the first and second attestations do not comprise digital certificates.

6. An attestation system as claimed in claim 1, wherein the authorization system includes an authorization service embedded within an application of the cloud computing environment.

7. An attestation system as claimed in claim 1, wherein the authorization system is to store the received first and second attestations in a data store, and the authorization system is to access the data store in response to the at least one query.

8. An attestation system as claimed in claim 7, wherein the authorization system is configured to:
   authenticate an identity of a user or application issuing a given one of the first and second attestations;
   store the given one of the first and second attestations in the data store in response to the authenticating.

9. An attestation system as claimed in claim 1, wherein the authorization system is to:
   authorize a requested action of the at least one query in response to determining, based on at least the selected second attestation, that the requesting user or application has a right to access the specified resource, and determining, based on the at least one first attestation, that the requesting user or application has the specified attribute.

10. An attestation system as claimed in claim 1, wherein each of the first attestations includes an identifier of a respective issuer of the corresponding first attestation.

11. A method of controlling access to resources in a cloud computing environment, the method comprising:
    receiving, by an authorization system including a physical processor, attestations from users or applications of a cloud computing environment, each of the attestations specifying that a respective subject is authorized to perform an action on a respective resource, and each of the attestations containing an identifier of a respective issuer of the corresponding attestation;

storing the attestations in a data store;

receiving, by the authorization system, a query responsive to a request from a requesting entity to perform an action with respect to a specified resource, the query including information identifying issuers trusted by the requesting entity;

in response to the query,
- select an attestation, from the attestations, that has an identifier of one of the issuers identified by the information, and
- determining, by the authorization system based on at least the selected attestation retrieved from the data store, whether the requesting entity is authorized to perform the action on the specified resource.

12. A method as claimed in claim 11, further comprising:

authenticating an identity of a user or application issuing a given one of the attestations; and storing the given attestation in the data store in response to the authenticating.

13. A method of providing secure attestations in a cloud computing environment comprising:

receiving, by an authorization system including a physical processor, an instruction to add an attestation, the instruction received in response to a request from a user or application of the cloud computing environment, and the attestation specifying that a respective subject is authorized to perform an action on a respective resource;

determining, by the authorization system, whether the user or application has authorization to add the attestation; and in response to determining that the user or application has authorization to add the attestation, storing, by the authorization system, the attestation that includes an identifier of the user or application, wherein the attestation is stored in a data store of attestations that each contain an identifier of a respective issuer of the corresponding attestation;

receiving, by the authorization system, a query responsive to a request from a requesting entity to perform an action with respect to a specified resource, the query including information identifying issuers trusted by the requesting entity; and in response to the query,
- select an attestation, from the attestations, that has an identifier of one of the issuers identified by the information, and
- determining, by the authorization system based on at least the selected attestation retrieved from the data store, whether the requesting entity is authorized to perform the action on the specified resource.

14. A method as claimed in claim 13, wherein a given one of the attestations specifies that a group of entities has a right to access a respective resource.

* * * * *